United States Patent [19]
Duckett

[11] 3,962,660
[45] June 8, 1976

[54] PALLET PAD FOR TRANSFORMERS AND TRANSFORMER AFFIXED THEREON

[75] Inventor: Don A. Duckett, Waukesha, Wis.

[73] Assignee: RTE Corporation, Waukesha, Wis.

[22] Filed: Nov. 25, 1974

[21] Appl. No.: 526,892

[52] U.S. Cl. .............................. 336/65; 108/51; 108/53; 248/19; 248/346; D12/53
[51] Int. Cl.² ...................... H02B 5/00; B65D 19/24
[58] Field of Search ................ 174/1, 37, 38, 50; 317/120; 336/65; 52/27, 126, 292, 293, 294, 295; 108/51, 53; 206/386, 512; 248/19, 23, 346, 350; D12/53

[56] References Cited
UNITED STATES PATENTS

| | | | |
|---|---|---|---|
| 2,936,984 | 5/1960 | Skubic | 108/53 |
| 3,604,306 | 9/1971 | Denholm | 248/19 X |
| 3,652,044 | 3/1972 | Manross | 248/23 |
| 3,677,200 | 7/1972 | Coccagna et al. | 108/53 |
| 3,713,620 | 1/1973 | Tkach | 248/19 |
| 3,722,845 | 3/1973 | Unger | 248/19 X |
| 3,752,087 | 8/1973 | Finke | 108/53 X |
| 3,762,343 | 10/1973 | Thacker | 108/53 |
| 3,790,115 | 2/1974 | Fox et al. | 248/19 |
| 3,841,032 | 10/1974 | Grannis | 52/27 |

OTHER PUBLICATIONS
Sales Bulletin entitled "Polyethylene (sic) Transformer Pad Foam Filled," published by Fiberglass Specialists, 102 East Pioneer, Phoenix, Arizona 85040, accompanied by two test reports (dated Dec. 8, 1971) relating to load tests and flame tests conducted on transformer pads as shown and described in the sales Bulletin, the load test report including two photographs.

*Primary Examiner*—Laramie E. Askin
*Attorney, Agent, or Firm*—Ronald E. Barry

[57] ABSTRACT

A ground level transformer unit including a transformer and a pallet-pad, the pad being formed from a lightweight material and having on one side supporting surfaces of sufficient strength to form a pad mount base for the transformer and a surface for transporting the transformer unit by a fork lift truck and on the other side a number of latching points for accommodating a number of different size transformers, and a tamper proof ridge positioned to correspond to the dimensions of the various size transformers. The pad is permanently attached to the transformer for installation on site. The transformer units can be stacked for storage and shipped as a unit.

10 Claims, 4 Drawing Figures

PALLET PAD FOR TRANSFORMERS AND TRANSFORMER AFFIXED THEREON

BACKGROUND OF THE INVENTION

Distribution transformers are generally transported on skids to their point of use. The transformers are then transferred from the skids to ground level pads and permanently mounted thereon. The ground level pads must be prepared in advance to accommodate a particular size transformer as well as the underground cables which are connected to the transformer. Each of the ground level pads must be separately designed to accommodate the anticipated transformer and must be replaced in the event a larger transformer is substituted for the original transformer.

SUMMARY OF THE INVENTION

The pallet-pad of the present invention is light in weight and can be used to transport a transformer as well as to provide a base for the transformer at the point of use. The pad is formed from a foamed or cellular plastic material so that it is light in weight for ease of handling. The pad is of sufficient strength to be transported by fork lift trucks and to support the transformer at the point of use. A number of differently spaced latching points are provided in the pad so that the pad can be used for different size transformers. Integral tamper proof ridges are formed on the upper surface of the pad which correspond with the lower edges of the transformer covers to prevent tampering with the terminal connections after installation. The pad with the transformer attached is capable of being stacked for storage and provides a weatherproof base at the point of use.

DRAWINGS

DESCRIPTION OF THE INVENTION

Figure 1:
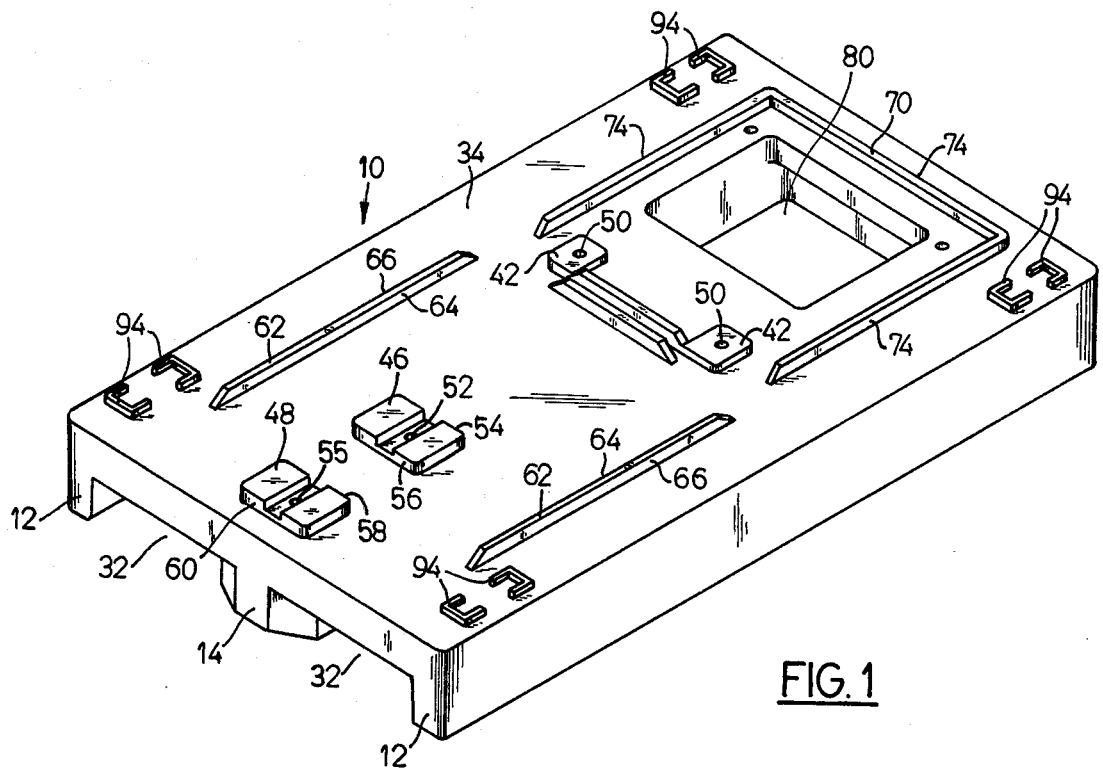
FIG. 1 is a perspective view showing the top of the pallet-pad according to the present invention.
Figure 2:
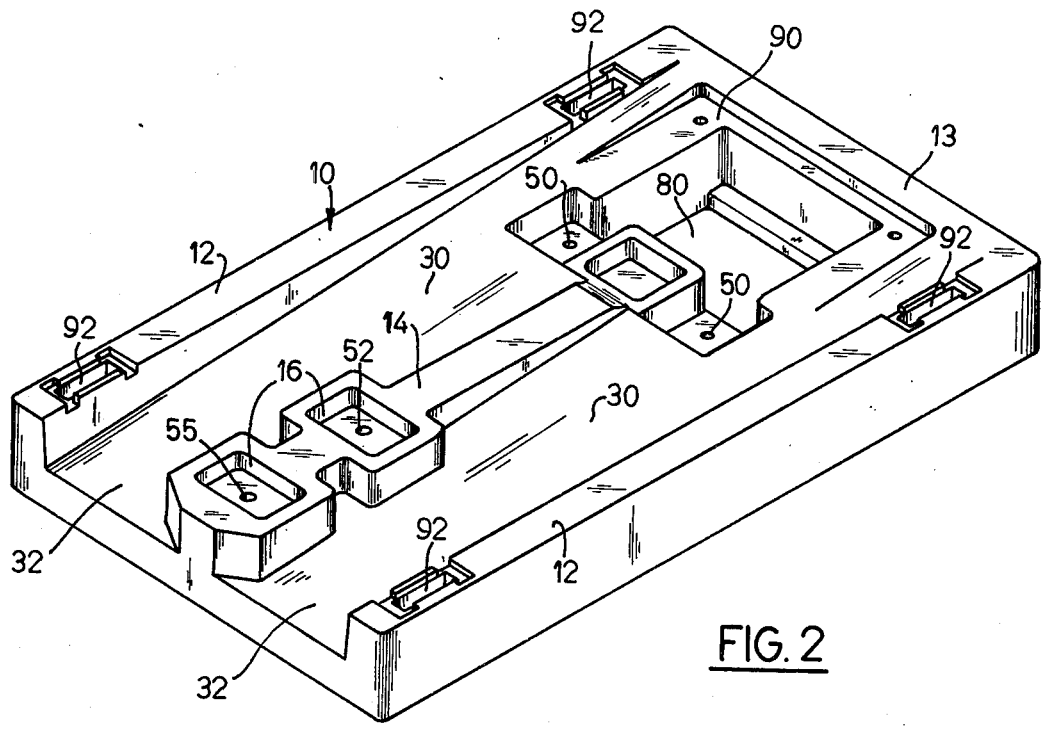
FIG. 2 is a perspective view of the bottom of the pallet-pad of FIG. 1.

The transformer unit according to the invention includes a transformer 15 and a pad 10. The pad 10, as shown in FIGS. 1 and 2, is molded as a single structure from a lightweight cellular or foam plastic material. This material can be a polyethylene plastic and can be combined with a bituminous material for increased strength. Either castable material such as concrete and asphalt with appropriate fillers can also be used. The pallet pads 10 are used to store, transport and support transformers 15 of various sizes as described hereinafter.

First means are provided on the undersurface of the pallet-pad 10 for forming a base for supporting the transformer unit on the ground. Such means is in the form of a pair of parallel sidewalls 12, an end wall 13, and a center wall 14. A pair of rectangular pockets 16 are provided in the wall 14 to provide access to the latching point bosses 46 and 48 for the transformers 15 as described hereinafter.

Second means are provided on the bottom of the pad for receiving the tines of a fork lift truck. Such means is in the form of a pair of slots 30 provided on each side of the center wall 14. The slots 30 are located in the spaces 32 provided between the walls 12 and 14 in a parallel relation to walls 12 and are inclined downwardly and terminate at the wall 13 at the other end of the pad.

Means are provided on the upper surface 34 of the pad 10 for accommodating various size transformers 15. Such means is in the form of a pair of fixed latching bosses 42 located at spaced intervals from two latching point bosses 46 and 48. Each of the latching bosses 42 includes an opening 50. The latching boss 46 is provided with an opening 52 and locating surfaces 54 and 56. The latching boss 48 includes an opening 55 and includes locating surfaces 58 and 60.

In this regard, the locating surfaces 54 and 56 are used to locate the two small size transformers on the upper surface of the pallet-pad 10. The smaller size transformers are secured to the pad 10 by passing mounting bolts 51 through openings 50 and 52. The locating surfaces 58 and 60 are used to locate the next two larger size transformers on the pallet pad 10. The larger size transformers are secured to the pad by passing the mounting bolts through openings 50 and 55.

Means are provided along each edge of the upper surface of the pad to aid in locating the transformers on the surface of the pad. Such means is in the form of a pair of ribs 62. The inside surfaces 64 of the ribs 62 are spaced apart a distance sufficient to engage the outside surface of transformers that are engageable with locating surfaces 54 and 56. The outside walls of transformers that are adapted to be located on surfaces 58 and 60 will fit on the outside surfaces 66 of the ribs 62.

The cover for the transformer is protected from tampering by means of a tamper proof ridge 70. The outside edge 74 will engage the inside surface of the covers which are used for all size transformers.

Figure 3:
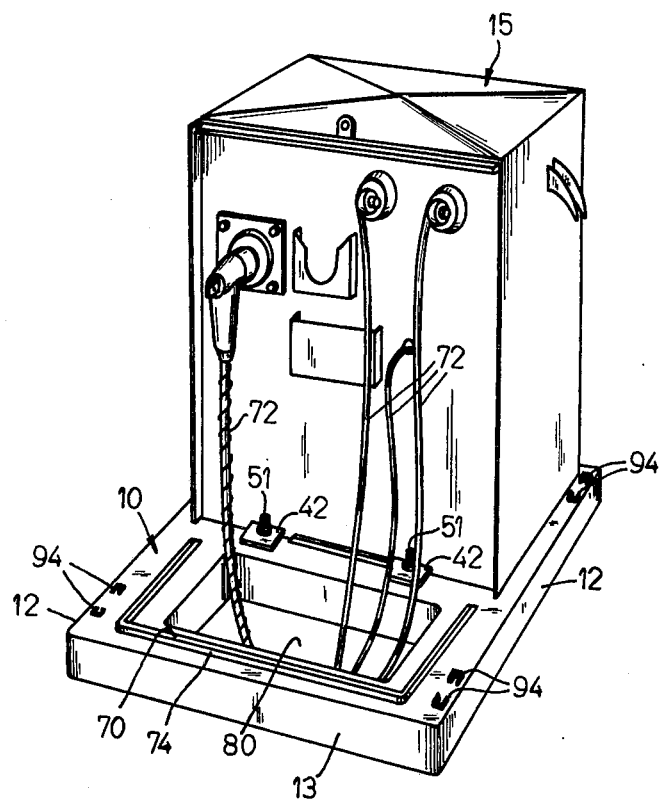
FIG. 3 is a perspective view of a typical mounting arrangement for the transformer unit with the cover removed.
Figure 4:
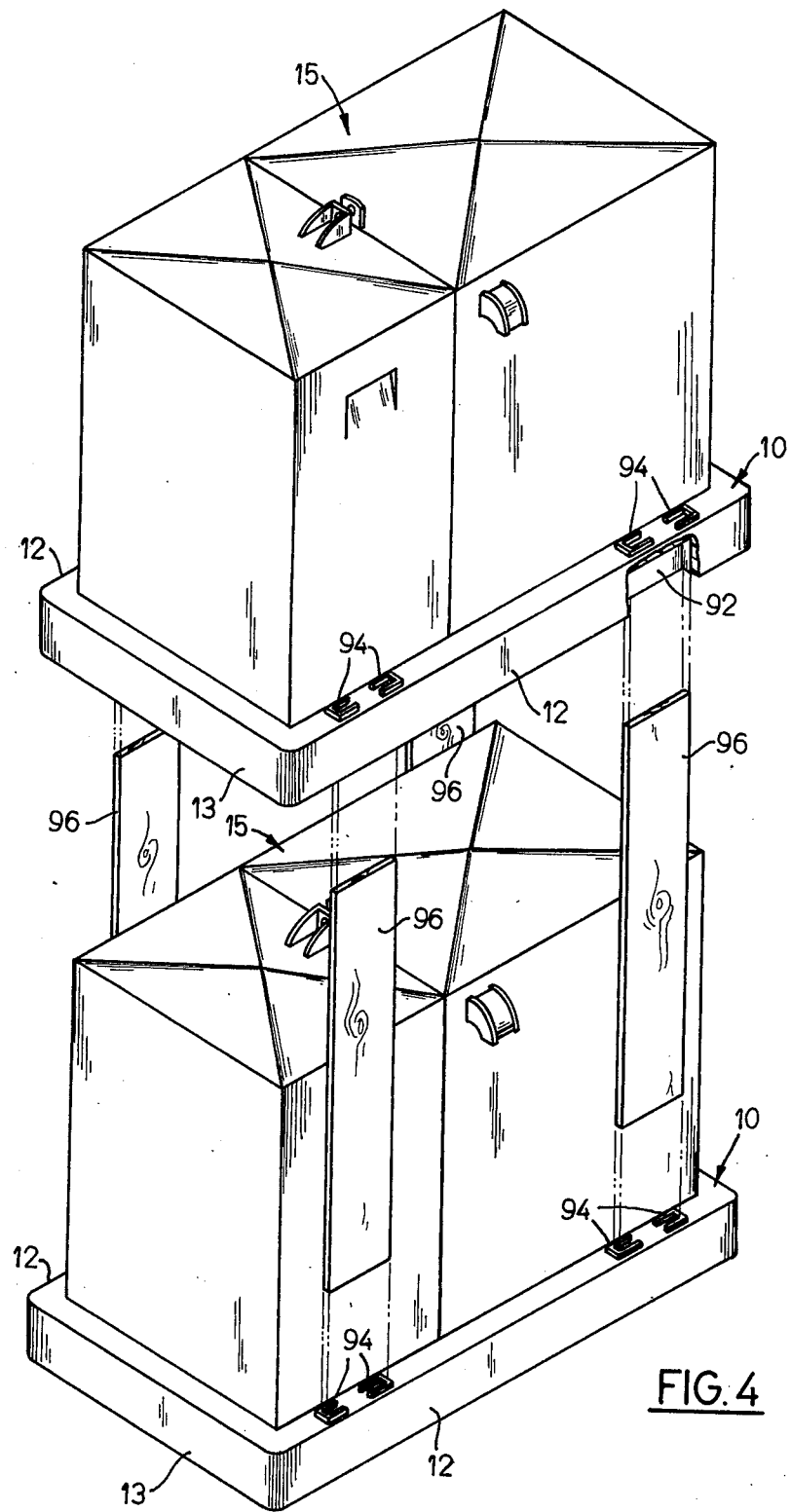
FIG. 4 is an exploded perspective view of the transformer units showing the supporting members used for stacking, with a portion of the pad broken away to show one of the members.

Means are provided within the confines of the ridge 70 for connecting the distribution leads 72 to the transformer. Such means, as seen in FIG. 3, is in the form of an opening 80 which is located between the end of the center support section 14 and the end wall 13.

Means are provided for stacking the pallets 10 for storage. Such means is in the form of a recess 90 provided in the undersurface of the pads 10. The recess 90 has an inner dimension corresponding to the outer dimension of the ridge 70 so that the ridge 70 fits within the recess 90. It should be noted that the pockets 16 are of sufficient size to allow the latch point bosses 46 and 48 to fit within the pockets 16 when stacked.

The pads 10 are also provided with means for stacking the pallet pads with the transformers 15 attached. Such means is in the form of a number of recesses 92 provided on the undersurface of the pad 10 and a number of mounting bosses 94 provided at corresponding points on the upper surface of the pad so that support members 96 can be positioned between the pads to support the transformers 15. In this regard, the lower end of each support member is seated in the mounting boss 94 and the upper end is seated in the recess 92 in the undersurface of the support pad.

It should be noted that the recesses 92 correspond in configuration to the mounting bosses 94. The mounting bosses 94 will then fit within the recesses 92 when the transformer palletpads are stacked on top of each other.

Although the pallet pad has been described specifically for use with a transformer, the pallet pad can also be used with electrical switch gear that is enclosed within a housing. The supporting, transporting and stacking functions of the pallet pad will remain the same. However, the mounting arrangement for the switch gear housing will vary. The pallet pad when used with electrical equipment such as switch gear will be secured to the electric switch gear to form an electrical unit that can be transported, stacked for storage and permanently supported at the point of installation in the same manner as the transformer unit.

I claim:

1. A ground level transformer unit comprising:
a transformer and a pallet pad, said pad being formed as one piece from a lightweight cellular plastic material and being affixed to said transformer for providing a shipping pallet and a permanent mounting base,
an opening through said pad to provide access for connecting said transformer to underground electrical cables below said pad and a ridge formed as an integral part of said pad around said opening to matingly engage said transformer to prevent tampering.

2. The transformer unit according to claim 1 wherein said pad includes means for accommodating transformers of various sizes.

3. The transformer unit according to claim 1 wherein said pad includes a pair of inclined slots for receiving the tines of a fork lift truck whereby said unit can be transported as a unit.

4. A transformer unit comprising a transformer mounted on a pallet pad, said pallet pad being formed as one piece from a lightweight cellular plastic material having sufficient strength to support the transformer on the ground,
an inclined surface on the bottom of said pad providing a supporting surface for the tines of a fork lift truck for transporting the pad with the transformer attached,
and support walls on the bottom of said pad providing a base for supporting the transformer unit on the ground.

5. The unit according to claim 4 wherein said pallet pad includes locating ridges on the upper surface for accommodating different size transformers.

6. The unit according to claim 5 wherein said pallet pad includes a first pair of securing bosses for all size transformers and a number of second securing bosses located at different spaced intervals from said first pair of securing bosses to accommodate different size transformers.

7. The unit according to claim 4 including an opening in said pallet pad for accommodating underground transformer leads.

8. A transformer pallet pad, said pad comprising:
a pallet pad formed of lightweight cellular plastic material having sufficient strength to support a transformer on the ground,
an opening on the bottom of said pad for receiving the tines of a fork lift truck,
a number of bosses on the upper surface of said pad for securing various size transformers to the pad,
a second opening in said pad for accommodating underground cable leads,
and a ridge formed as an integral part of the upper surface of said pad around the outer periphery of a portion of said second opening to matingly engage the transformer and prevent tampering.

9. The pallet-pad according to claim 8 including a number of mounting bosses on the upper surface of said pad and a corresponding number of recesses in the undersurface of said pad, said bosses and recesses being located to engage the ends of supporting members seated in adjacent pads when stacked.

10. An electrical unit comprising an electrical device and a pallet pad, the pallet pad being formed from a foamed-plastic material and a filler and having sufficient strength to support the electrical device on the ground,
a pair of slots in the bottom of said pad providing a supporting surface for transporting the electrical device and pallet pad as a unit on the tines of a fork lift truck,
means on said pad providing a base for supporting the unit on the ground,
an opening through said pad for accommodating underground cable leads and a ridge formed as an integral part of the upper surface of said pad around the outer periphery of a portion of said opening to matingly engage the electrical device and prevent tampering.

* * * * *